United States Patent Office 3,369,179
Patented Feb. 13, 1968

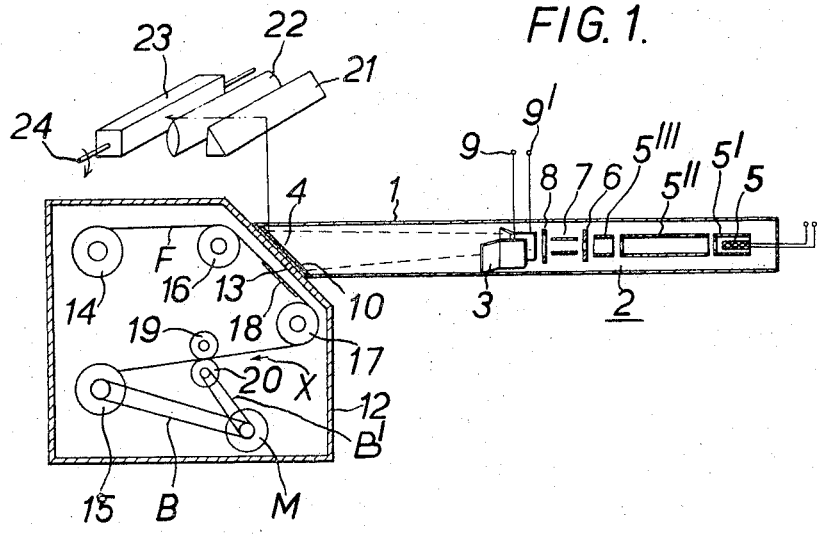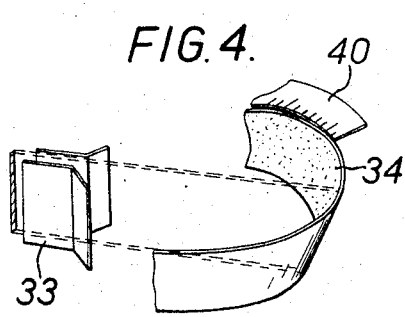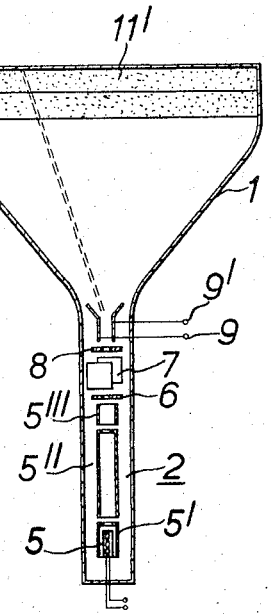

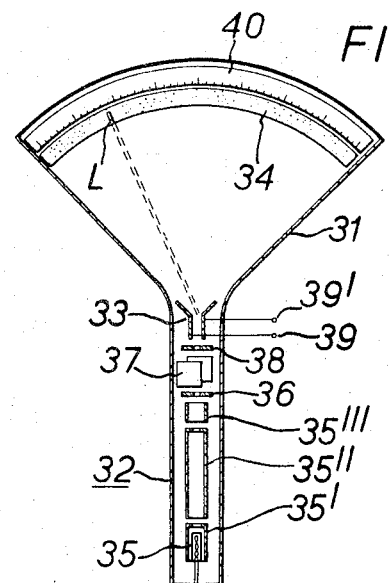
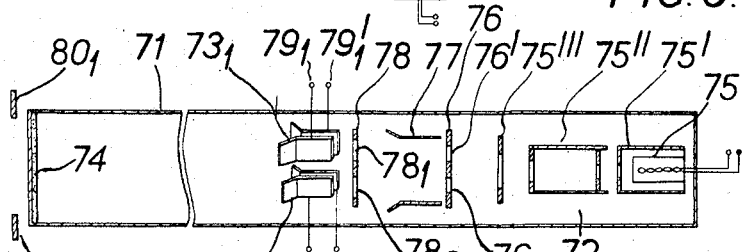
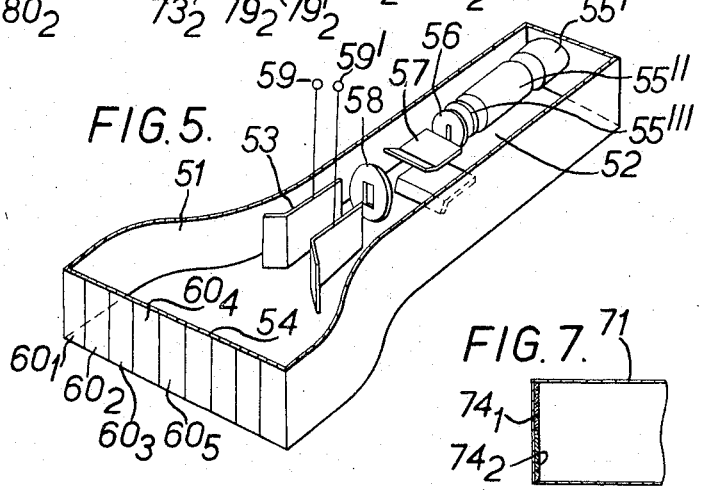
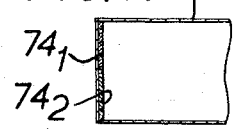

3,369,179
CATHODE RAY TUBE READOUT HAVING A TWO PHOSPHOR SCREEN FOR SIMULTANEOUS VISUAL AND PHOTOGRAPHIC READOUT
Toshio Tanaka, Fushimi-ku, Kyoto, Japan, assignor to Tateise Denki Kabushikikaisha, Kyoto, Japan, a corporation of Japan
Filed Mar. 1, 1963, Ser. No. 262,040
Claims priority, application Japan, Mar. 8, 1962, 9,070/37
2 Claims. (Cl. 324—121)

This invention relates to an electrical measuring instrument in which the electron beam is utilized to convert electrical quantities under measurement into visible displacements on the screen of a cathode-ray tube.

In the measurement of electrical quantities, indicating instruments adapted for general use have employed mechanically movable members such as a needle provided with a pointer which moves over a graduated scale for indication of the results of measurement. Because of their mechanical construction, the instruments of this type were apt to give erroneous readings caused by erratic swinging of the needle due to the moment of inertia acting thereon, and their speed of response was limited.

Such instruments have been to some extent replaced by cathode-ray tube instruments, wherein the pointer is an electron beam. The primary object of this invention is to provide an improvement of this latter type of electrical measuring instrument, which is capable of visualizing electrical quantities under measurement without using any mechanical movable members. The instrument of the invention employs a cathode-ray tube so constructed that the electron beam is deflected an amount proportional to the quantity under measurement so that the position of the resulting luminous area on the screen is determined by the measured quantity in a known manner. The invention lies in special features of tube construction whereby the luminescent screen may be observed from a position at the side of the cathode-ray tube, as opposed to being observable only from the front as in a conventional tube instrument. To achieve this purpose, the luminescent screen according to the invention is inclined with respect to the longitudinal axis of the tube and means are coupled with a side wall of the tube for optically observing the position of the luminescent point on the screen. Among other advantages, this approach enables observations to be made from the front and side (or top) of the tube simultaneously, such as for photographic recording and concurrent visual observation.

Other objects, features and advantages of the invention will be more apparent from the following detailed explanation with reference to the accompanying drawings wherein:

FIGURE 1 is a view partly in side section and partly in perspective of an electrical measuring instrument embodying the invention;

FIGURE 2 is a plan view of the cathode-ray tube shown in FIGURE 1, with its top wall cut away to illustrate the inside thereof;

FIGURE 3 is a plan view of another embodiment of the invention, with its top wall cut away to show the inside thereof;

FIGURE 4 is an enlarged fragmentary view in perspective of FIGURE 3;

FIGURE 5 is a perspective view showing another feature of the invention;

FIGURE 6 is a side sectional view of still another modification of the invention; and FIGURE 7 is a section of a modification of the fluorescent screen shown in FIGURE 6.

The electrical measuring instrument of the invention comprises: an electron emission tube including side walls, electron gun means for directing a beam of electrons longitudinally of said tube, means responsive to an input signal to be measured for deflecting said electron beam in accordance with said signal, and a screen positioned in the path of said screen and operable to luminesce at the point of beam impingement thereon whereby the position of said luminescent point indicates the value of said signal. Means are included for positioning the screen at an angle of inclination with respect to the electron beam, the angle being the same in all planes perpendicular to the screen at beam impingements thereon. The angle is further defined so that the screen is positioned transverse to a direction of observation from a side wall location on said tube.

The screen is preferably elongated laterally in the direction of beam deflection and may be either flat or curved laterally, while having the aforementioned substantially constant angle of inclination vertically. Certain modifications as shown in the drawings will be described presently.

Referring first to FIGURES 1 and 2, the electronic means consists essentially of a flat cathode-ray tube 1 which contains an electron gun generally designated at 2, a deflection system 3 consisting of a single pair of plates spaced symmetrically about the axis of the gun and having flared ends, and a fluorescent screen 4 placed at the end of the tube. The fluorescent screen is shown of an elongated rectangular shape. Although the illustrated shape is preferred, it may take any other suitable shape. The gun consists of a cathode 5, a control grid 5′, a first accelerating electrode 5″, a second accelerating electrode 5‴, a beam-forming electrode 6 having a slit therein, a focusing system 7 consisting of a pair of spaced plates, and a third accelerating electrode 8. Electrons emitted from cathode 5 are accelerated as they pass through accelerating electrodes 5″, 5‴, formed by the slit of electrode 6 into a beam having a rectangular section as narrow as possible, focused by means of focusing system 7, further accelerated by electrode 8, and then pass between deflecting plates 3. The shape of the slit formed in electrode 6 depends on in what shape it is desired to focus the beam on the screen. In the illustrated embodiments, it is so shaped that the beam is focused on the screen in a line, without any intention to restrict the scope of the invention thereto.

To the deflecting plates are connected leads 9, 9′ through which a voltage proportional to an electrical quantity, such as voltage and current, to be measured may be impressed between the deflecting plates. When a voltage is applied to the deflecting plates, an electric field proportional to the applied voltage is created within the space between the plates. This will deflect the electron beam passing therebetween an amount proportional to the magnitude of the field and, consequently, to the electrical quantity under measurement. The beam deflected in this manner will finally strike the fluorescent screen at a certain position thereon, causing a luminous line to appear at that position. The line extends along the short axis of the screen, preferably from the upper to the lower edge thereof. When the applied voltage changes, the deflection angle of the beam also changes, causing the luminous line on the screen to move a distance corresponding to the beam deflection along the long axis of the screen.

It should be noted that in the preferred cathode-ray tube constructed in accordance with the invention, the beam is deflected along only a single, major axis of the screen by a single pair of deflecting plates.

Thus the shape of the cathode-ray tube and its operation in connection with the electron beam deflection, differ from those of ordinary cathode-ray tube type measuring instruments. While the ordinary cathode-ray tubes are provided with two sets of deflecting plates, that is, horizontal and vertical deflecting plates, the cathode-ray tube of the invention has only one set of deflecting plates, with the resultant difference that the tube may have a flat shape, which confers advantages thereon from the standpoint of screen observation from the side wall location. While a plurality of sets of deflecting plates may be provided, they all perform the same function individually, namely that of applying only lateral deflection force to their own beam. Thus the luminescence point on the screen may take the preferred shape of a line, rather than the usual spot.

In the embodiment of the invention shown in FIGURE 1, the means for indicating the position of the luminous line on the screen consists of two different means, one of which is for viewing and the other is for recording. This arrangement is especially suitable when it is required to operate the two means simultaneously. Cathode-ray tube 1 has its face 10 inclined at 30° to 60° and preferably 45° to the axis of the tube. Face 10 and a portion of the top wall of tube 1 adjacent to the face are made transparent. The fluorescent screen 4 covers the inside of face 10 and is divided into two laterally extending portions or strips 11, 11', the lower one 11 of which is non-persistence, while the upper one 11' is of suitable persistence. When the electron beam hits the screen, a luminous line produced there crosses the two portions 11 and 11' at the same time. As previously described, the luminous line extends in a direction perpendicular to that of extension of the two strips 11, 11'. The light emitted from that part of the luminous line on the lower portion 11 of the screen penetrates tube face 10 and enters the recording means, while the light from the other part of the line on the upper portion 11' of the screen reaches the viewing means.

The components parts of the recording means are enclosed within a dark box 12 which is so disposed relative to the cathode-ray tube that one of its side walls abuts on the outside of tube face 10. In this side wall there is formed a slit 13 running along the whole length of the lower portion 11 of the screen. Inside the dark box, a film F from a reel 14 is moved in the direction of the arrow X over rolls 16, 17 and between a capstan 19 and a roll 20, and finally wound on a take-up reel 15, with a synchronous motor M driving both reel 15 and roll 20 through belts B and B' respectively. Midway between rolls 16 and 17, the film passes by slit 13, where it is exposed to light from the luminous line on the screen. In order to keep the distance between slit 13 and the face of the film constant and as short as possible, a plate 18 is disposed below slit 13 at a predetermined short distance therefrom so that the film sliding on the plate is firmly supported by it. The luminous line produced on the screen by electron bombardment crosses slit 13, so that the light passing therethrough to enter dark box 12 is defined by the widths of the line and the slit to form a small area or spot on the film. It is needless to say that the film must be as wide as the length of the slit.

With the electron beam being deflected an angle proportional to a voltage applied to the deflecting plates, a luminous line appears at a position on the screen corresponding to the beam deflection, and part of the light emitted from the line enters the dark box to be thrown onto the film, with a resultant exposure of a small area or spot at a position on the film corresponding to the position of the luminous line on the screen. As the applied voltage changes, so will the deflection of the electron beam. This will cause the spot of light thrown on the film to move across the width thereof a distance proportional to the change in the applied voltage, and with the film running at a predetermined speed in the direction perpendicular to that of the beam deflection, the light leaves its latent trace on the film in the form of a continuous line generally along the length of the film. Upon development of the exposed film, the continuous line becomes apparent. In the film, as the time axis is provided by the length of the film, a point on the continuous line shows a deflection of the electron beam and, consequently, the electrical quantity to have been measured at a given time. In this manner, recording of electrical quantities to be measured may be photographically made.

The viewing means, as illustrated in FIGURE 1, consists of a prism 21, a convex lens 22 and a rotary mirror 23 carried on a shaft 24. These optical members are so arranged that light from that part of the luminous line on the upper portion 11' of the screen is reflected by prism 21 to be thrown onto mirror 23 through lens 22. As the electrical quantity under measurement and, consequently, the deflecting voltage varies, the beam deflection varies, resulting in a displacement of the luminous line on the screen along the long axis thereof and, consequently, of its projection on the rotary mirror. Thus an electrical quantity under measurement can be indicated by the relative position of the luminous line on the rotary mirror.

In accordance with the invention, the voltage to be applied to the deflecting plates may be either direct or alternating. When it is direct, the luminous line on the screen remains stationary at a position thereon and, consequently, the trace of the line on a running film is straight along the length of the film until the voltage changes. When the applied voltage is alternating, its cyclic variation causes the luminous line to swing back and forth a distance along the long axis of the screen, its trace on a running film being generally of a wave shape. When the alternating voltage changes in value, the distance the luminous line moves back and forth on the screen also changes, resulting in a corresponding change in the amplitude of the wave recorded on the film.

The arrangement of FIGURE 1 is especially suitable for both viewing and recording an electrical quantity at the same time. With this arrangement the viewing means and the recording means are supplied with light from different parts of the luminous line, so that more light can be supplied to the individual means than otherwise.

FIGURES 3 and 4 show another embodiment of the invention, wherein the electronic means consists of a flat cathode-ray tube 31 containing an electron gun generally designated at 32, a deflection system 33 consisting of a single pair of plates, and a fluorescent screen 34. The electron gun consists of a cathode 35, a control grid 35', a first accelerating electrode 35", a second accelerating electrode 35''', a beam-forming electrode 36 having a slit therein, a focusing system 37 consisting of a pair of plates, and a third accelerating electrode 38. Electrons emitted from cathode 35 are formed and focused into a beam of as narrow a rectangular section as possible by electrodes 36 and 37. When a voltage proportional to an electrical quantity to be measured is impressed between the deflecting plates through leads 39, 39', the electron beam passing therethrough is deflected accordingly and hits the screen at a position corresponding to the beam deflection.

So, far, the structure and operation of this embodiment are the same as those of the previously described one. In this embodiment, however, the screen is formed into a circular arc and, at the same time, inclined at a predetermined angle to the direction in which the beam flies, as clearly shown in FIGURE 4. This makes the screen look sector-shaped in a plan view. Along the upper edge of the screen is arranged a calibrated plate 40.

The electron beam from the gun is deflected proportionally to the electrical quantity under measurement and impinges on the screen, producing there a luminous line L, the position of which is indicated on the calibration of the plate. Due to the arcuate formation of screen 34, the electron beam, even when thrown on the screen adjacent to either end thereof, will differ very little in width from when it is near the center of the screen. Thus errors in readings, which would be caused by variation of the width of the luminous line on the screen, can be completely eliminated. Calibrated plate 40 may be placed either inside or outside tube 31.

Another embodiment of the invention is illustrated in FIGURE 5. Just as in the previous two embodiments, the electronic means consists essentially of a flat cathode-ray tube 51 enclosing an electron gun generally designated at 52, a deflection system 53 consisting of a single pair of plates, and a fluorescent screen 54. The electron gun consists of a cathode not shown, a control grid 55′, a first and a second accelerating electrode 55″ and 55‴, a beam-forming electrode 56 having a slit therein, a focusing system 57 consisting of a pair of plates, and a third accelerating electrode 58. Electrons emitted from the cathode are formed and focused into a beam having as narrow a rectangular section as possible, deflected proportionally to a voltage applied to the deflecting plates, and finally strikes the screen. Just as before, the applied voltage is proportional to an electrical quantity to be measured.

The special feature of this embodiment lies in the structure of the screen. As shown in FIGURE 5, screen 54 is divided into as many sections as desired, such as $60_1$, $60_2$, $60_3$, $60_4$, $60_5$. These sections are composed of different fluorescent materials which produce light of different colors under impact of electrons. Alternatively, the sections may be so composed that they produce light of the same color, but of different degrees of brightness. To bring about this latter effect, the fluorescent material of the individual sections of the screen may contain the same compounds in different ratios of mixture.

The electron beam is deflected at an angle proportional to a voltage applied to the deflecting plates through leads 59, 59′, and hits the screen, producing there a luminous line. The line changes in color or brightness as it appears on different sections of the screen. Thus the deflection angle of the electron beam and, consequently, the electrical quantity under measurement can be recognized by observing which of the colors arranged over the screen the luminous line assumes at a given time of measurement, and scale markings are required for indicating the position of the luminous line on the screen. If the operator of the instrument memorizes the color arrangement on the screen, he can detect the deflected position of the luminous line and, consequently, the electrical quantity under measurement by merely recognizing the color the luminous line takes at each time of observation. Since no markings need be observed, the instrument may be operated in the dark, and readings may be more easily obtained from a relatively long distance.

It is often required to measure a plurality of electrical quantities individually and simultaneously. To meet this requirement, a multigun type of cathode-ray tube may be employed. Preferably, however, a single-gun type is used for the purpose as shown in FIGURE 6, with its various advantages over the multigun type, means are provided for dividing electrons emitted from the single gun into a plurality of beams.

To explain in detail, cathode-ray tube 71 includes a single electron gun generally designated 72, a plurality of deflection systems, such as $73_1$, $73_2$, each consisting of a single pair of deflecting plates, and a fluorescent screen 74. As many deflection systems as desired may of course be provided, but the following explanation will be made on the assumption that there are two of them. The electron gun consists of a cathode 75, a control grid 75′, a first and a second accelerating electrode 75″, 75‴, a beam-forming electrode 76, a focusing system 77 consisting of a pair of plates, and a third accelerating electrode 78. Beam-forming electrode 76 has two slits $76_1$, $76_2$ which divide and form the electrons into two separate beams each having as narrow a rectangular section as possible. Electrode 78 also has two slits $78_1$, $78_2$ for the two beams to pass through respectively. The two beams thus formed and accelerated pass through deflection systems $73_1$, $73_2$ respectively. Since two different voltages corresponding respectively to two electrical quantities to be measured are applied to the two deflection systems through leads $79_1$, $79_1'$ and $79_2$, $79_2'$ respectively, the two beams passing therethrough are deflected proportionally to the two voltages acting thereon and hit the screen to produce there two luminous lines. The positions of these two lines on the screen are determined by the deflecting voltages and, consequently, the electrical quantities under measurement. Then to read the positions on calibrated plates $80_1$, $80_2$ is to know the electrical quantities individually and simultaneously. Again, the deflection systems are of the same function, that is, each of them deflects its own electron beam along only the long axis of the screen.

FIGURE 7 shows a modification of the screen of FIGURE 6. Here, it is especially intended to make it easier for the viewer to distinguish between the two luminous lines on the screen. As illustrated, the screen is divided into two portions or strips $74_1$, $74_2$ extending in the direction of deflection of the beams. These portions are composed of different fluorescent materials which produce light of different colors under the impact of electrons. Needless to say, the screen may be divided into as many strips as desired, the number depending upon the number of electron beams employed. With the construction shown in FIGURES 6 and 7, it is possible for a single gun to work as much as if a plurality of guns are provided.

It should be recognized that the embodiments disclosed herein are merely representative and that further modifications and changes may be made without departing from the true scope and spirit of the invention.

What is claimed is:

1. An electrical measuring instrument comprising an electron emission tube having:
    (a) electron gun means for directing a beam of electrons longitudinally of said tube and including means responsive to an input signal to be measured for deflecting said beam laterally in accordance with said signal;
    (b) a first pair of side walls which diverge from the longitudinal axis of said tube substantially in the directions, respectively, of maximum beam deflections;
    (c) a second pair of side walls connected to the first pair, said second pair being parallel and substantially flat and closely spaced in a direction perpendicular to the direction of lateral beam deflection; and
    (d) a laterally elongated photoluminescent screen positioned at the forward end of said tube in the path of said electrons whereby the point of electron beam impingement thereon indicates the value of said signal, said screen
        (i) being inclined at an angle toward one of said second pair of side walls to enable the side of said screen impinged upon by the electron beam to be observed through said one side wall while also permitting observation of the other side of said screen from the forward end of said tube, and
        (ii) having first and second sections extending in the direction of deflection of said beam, the first section consisting of material having a high persistence characteristic for visual observation, the second section consisting of relatively nonpersistent material for photographic observation;
    (e) said electron gun means including means shaping said electron beam to impinge upon both of said screen sections simultaneously; and
    (f) said one of the second pair of side walls being adapted to permit observation of said screen therethrough.

2. The instrument defined in claim 1 wherein said screen comprises an arc having its center of curvature substantially coincident with the center of the beam deflecting means, and arcuate scale means positioned circumferentially coincident with said screen and having index lines extending radially in the direction of said beam and substantially aligned with scalar positions of said beam on said screen.

(References on following page)

References Cited

UNITED STATES PATENTS

| | | | |
|---|---|---|---|
| 2,098,231 | 11/1937 | Du Mont | 313—92 |
| 2,201,245 | 5/1940 | Ruska et al. | 313—92 |
| 2,394,196 | 2/1946 | Morgan | 324—121 X |
| 2,842,711 | 7/1958 | Frenkel | 313—92 |
| 3,005,125 | 10/1961 | Evans et al. | 313—92 |
| 3,047,870 | 7/1962 | Bousky | 346—110 |
| 3,184,753 | 5/1965 | Koster | 346—110 |

OTHER REFERENCES

Fairchild Oscillo-Record Camera, November 1952, 8 pages, Fairchild Camera and Instrument Corp., Jamaica 1, N.Y.

RUDOLPH V. ROLINEC, *Primary Examiner.*

WALTER L. CARLSON, *Examiner.*

G. L. LETT, E. F. KARLSEN, *Assistant Examiners.*